US011356309B2

(12) United States Patent
Hastings

(10) Patent No.: US 11,356,309 B2
(45) Date of Patent: *Jun. 7, 2022

(54) DEMODULATING SURVEILLANCE SIGNALS

(71) Applicant: Honeywell International Inc., Charlotte, NC (US)

(72) Inventor: Thomas W. Hastings, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/213,048

(22) Filed: Mar. 25, 2021

(65) Prior Publication Data

US 2022/0109592 A1  Apr. 7, 2022

Related U.S. Application Data

(63) Continuation of application No. 17/061,452, filed on Oct. 1, 2020, now Pat. No. 11,038,728.

(51) Int. Cl.
*H03K 9/00* (2006.01)
*H04L 27/00* (2006.01)
(Continued)

(52) U.S. Cl.
CPC ......... *H04L 27/144* (2013.01); *H04B 1/0007* (2013.01)

(58) Field of Classification Search
CPC .............................. H04L 27/144; H04B 1/0007
(Continued)

(56) References Cited

U.S. PATENT DOCUMENTS 6,483,453 B2  11/2002  Oey et al.
6,678,512 B1   1/2004  Kaminski et al.
(Continued)

FOREIGN PATENT DOCUMENTS

CN    203708241 U    7/2014
EP      1154589 A2   11/2001
(Continued)

OTHER PUBLICATIONS

Prosecution History from U.S. Appl. No. 17/061,452, dated Oct. 22, 2020 through Mar. 17, 2021, 19 pp.
(Continued)

*Primary Examiner* — Tanmay K Shah
(74) *Attorney, Agent, or Firm* — Shumaker & Sieffert, P.A.

(57) ABSTRACT

In some examples, a system includes a receiver configured to receive signals encoding first, second, and third messages in first, second, and third frequency bands. The system also includes a mixer configured to down-convert the received signals to intermediate-frequency (IF) signals based on a local oscillator signal. The system further includes at least one analog-to-digital converter configured to sample the IF signals at a sampling rate. A frequency band of the IF signals encoding the first message falls within a first Nyquist region, and a frequency band of the IF signals encoding the second message falls within a second Nyquist region. The first and second Nyquist regions are frequency ranges bounded by multiples of one-half of the sampling rate, and the second Nyquist region is different from the first Nyquist region. The system includes processing circuitry configured to determine data in the first, second, and third messages based on an output of the at least one analog-to-digital converter.

20 Claims, 8 Drawing Sheets

(51) Int. Cl.
*H04L 27/144* (2006.01)
*H04B 1/00* (2006.01)

(58) Field of Classification Search
USPC .................................................. 375/316
See application file for complete search history.

(56) References Cited

U.S. PATENT DOCUMENTS

| | | |
|---|---|---|
| 7,194,246 B2 | 3/2007 | Sorrells et al. |
| 7,376,446 B2 | 5/2008 | Licht |
| 7,688,243 B2 | 3/2010 | Hunter et al. |
| 8,077,757 B2 | 12/2011 | Maravic et al. |
| 8,543,074 B1 | 9/2013 | Laporte |
| 8,593,330 B2 | 11/2013 | Jones et al. |
| 8,594,440 B2 | 11/2013 | Obrador |
| 8,660,218 B2 | 2/2014 | Maleh et al. |
| 9,312,888 B2 | 4/2016 | Weissman et al. |
| 9,490,548 B2 | 11/2016 | Weissman et al. |
| 10,101,447 B2 | 10/2018 | Schulte |
| 10,230,412 B2 | 3/2019 | Kundmann et al. |
| 2006/0181457 A1 | 8/2006 | Bartz |
| 2008/0231488 A1 | 9/2008 | Pickerd et al. |
| 2010/0098191 A1 | 4/2010 | Morris et al. |
| 2012/0128082 A1 | 5/2012 | Morris et al. |
| 2013/0015998 A1 | 1/2013 | Jones et al. |
| 2017/0358227 A1 | 12/2017 | Troxel |
| 2019/0113617 A1 | 4/2019 | Troxel |
| 2019/0190594 A1 | 6/2019 | Stayton |
| 2020/0195327 A1 | 6/2020 | Thiagarajan et al. |
| 2020/0389193 A1 | 12/2020 | Brandao |
| 2021/0036420 A1 | 2/2021 | Ferguson et al. |

FOREIGN PATENT DOCUMENTS

| | | |
|---|---|---|
| EP | 2546678 A1 | 1/2013 |
| WO | 2014/191712 A1 | 12/2014 |

OTHER PUBLICATIONS

Maloratsky et al., "RF Design of Avionics L-band Integrated Systems," Microwave Journal, dated Oct. 1, 2009, accessed from https://www.microwavejournal.com/articles/print/8622-rf-design-of-avionics-I-band-integrated-systems, on Apr. 21, 2020, 14 pp.

Nguyen et al., "CFO Tracking for Direct RF Sampling Architecture Applied to VHF Avionic Radios," 2017 Integrated Communications, Navigation and Surveillance Conference (ICNS), IEEE, Aug. 17, 2017, 11 pp.

U.S. Appl. No. 16/568,708, filed Sep. 12, 2019, naming inventors Ferguson et al.

U.S. Appl. No. 16/850,343, filed Apr. 16, 2020, naming inventor Brandao.

U.S. Appl. No. 16/892,029, filed Jun. 3, 2020, naming inventor Brandao.

U.S. Appl. No. 17/061,426, filed Oct. 1, 2020, naming inventor Hastings et al.

U.S. Appl. No. 17/061,452, filed Oct. 1, 2020, naming inventor Hastings.

Extended Search Report from counterpart European Application No. 21199634.3 dated Feb. 18, 2022, 10 pp.

DEMODULATING SURVEILLANCE SIGNALS

The present application is a continuation of U.S. application Ser. No. 17/061,452, filed on Oct. 1, 2020, the entirety of which is hereby incorporated by reference.

TECHNICAL FIELD

This disclosure relates to surveillance communication for vehicles.

BACKGROUND

A vehicle may use multiple different communication protocols for surveillance messages. Each communication protocol may operate in an assigned frequency band. For example, a receiver for traffic collision avoidance system (TCAS) can receive messages encoded at 1090 MHz, while a receiver for air traffic control (ATC) transponder can receive messages encoded at 1030 MHz. A receiver for universal access transceiver (UAT) avionics functions can receive messages encoded at 978 MHz, and a receiver for distance measuring equipment (DME) can receive messages encoded throughout a band extending from 962 MHz to 1213 MHz.

SUMMARY

In general, this disclosure relates to a receiver system for demodulating surveillance signals by sampling intermediate-frequency (IF) signals at a frequency below the Nyquist sampling rate, which is two times the highest frequency to be sampled. Using the under-sampling techniques described herein, the IF signals encoding a first message will fall within a first Nyquist region, and the IF signals encoding a second message will fall within a second Nyquist region, where the first Nyquist region is different from the second Nyquist region, and where each Nyquist region is bounded by multiples of one-half of the sampling rate.

In some examples, a system is for demodulating a first message in a first frequency band, a second message in a second frequency band, and a third message in a third frequency band, wherein the first, second, and third frequency bands are non-overlapping bands. The system includes a receiver configured to receive signals encoding the first, second, and third messages and a mixer configured to down-convert the received signals to intermediate-frequency (IF) signals based on a local oscillator signal. The system also includes at least one analog-to-digital converter (ADC) configured to sample the IF signals at a sampling rate, where a frequency band of the IF signals encoding the first message falls within a first Nyquist region, and a frequency band of the IF signals encoding the second message falls within a second Nyquist region. The first and second Nyquist regions are frequency ranges bounded by multiples of one-half of the sampling rate, and the second Nyquist region is different from the first Nyquist region. The system further includes processing circuitry configured to determine data in the first, second, and third messages based on an output of the at least one ADC.

In some examples, a method is for demodulating a first message in a first frequency band, a second message in a second frequency band, and a third message in a third frequency band, wherein the first, second, and third frequency bands are non-overlapping bands. The method includes receiving, by a receiver, signals encoding the first, second, and third messages and down-converting, by a mixer, the received signals to intermediate-frequency (IF) signals based on a local oscillator signal. The method also includes sampling, by at least one analog-to-digital converter (ADC), the IF signals at a sampling rate, where a frequency band of the IF signals encoding the first message falls within a first Nyquist region, and a frequency band of the IF signals encoding the second message falls within a second Nyquist region. The first and second Nyquist regions are frequency ranges bounded by multiples of one-half of the sampling rate, and the second Nyquist region is different from the first Nyquist region. The method further includes determining, by processing circuitry, data in the first, second, and third messages based on an output of the at least one ADC.

In some examples, a system is for demodulating a first message in a first frequency band, a second message in a second frequency band, and a third message in a third frequency band, wherein the first, second, and third frequency bands are non-overlapping bands. The system includes a receiver configured to receive signals encoding the first, second, and third messages and a mixer configured to down-convert the received signals to intermediate-frequency (IF) signals based on a local oscillator signal. The system also includes at least one analog-to-digital converter configured to sample the IF signals at a sampling rate. The system further includes processing circuitry configured to determine data in the first message based on a first image of the IF signals encoding the first message. The processing circuitry is further configured to determine data in the second message based on a second image of the IF signals encoding the second message. The processing circuitry is also configured to determine data in the third message based on a third image of the IF signals encoding the third message, where the first, second, and third images are located in a lowest Nyquist region, a frequency band of the IF signals encoding the first messages falls within a first Nyquist region, and a frequency band of the IF signals encoding the second messages falls within a second Nyquist region. The first and second Nyquist regions are frequency ranges bounded by multiples of one-half of the sampling rate, the second Nyquist region is different from the first Nyquist region, and the second Nyquist region is different from the lowest Nyquist region.

The details of one or more examples of the disclosure are set forth in the accompanying drawings and the description below. Other features, objects, and advantages will be apparent from the description, drawings, and claims.

DETAILED DESCRIPTION

Various examples are described below for receiving and demodulating surveillance signals across multiple frequency bands. A receiver may include one or more antennas for receiving radio-frequency (RF) signals. A first portion of the RF signals may include a first encoded surveillance message in a first frequency band, while a second portion of the RF signals may include a second encoded surveillance message in a second frequency band. In addition, a third portion of the RF signals may include a third encoded surveillance message in a third frequency band. The first, second, and third frequency bands are non-overlapping bands. The receiver may also include a mixer to down-convert the RF signals and an analog-to-digital converter (ADC) to sample the down-converted signals.

In some examples, the receiver also includes a set of splitters and a set of combiners for splitting and combining the RF signals. Each splitter can generate separate signals in two or more of the frequency bands that encode the surveillance messages. The separate signals are routed to the combiners, which can output combined signals to one or more mixers. The splitters and combiners may rearrange the signals for the mixer(s) and ADC(s) to allow for sampling of the primary ports of two different antennas for a first surveillance protocol and for sampling of the primary and secondary ports of the same antenna for a second surveillance protocol.

In some examples, an ADC may be configured to sample the down-converted signals (e.g., intermediate-frequency (IF) signals) that are outputted by the one or more mixers. A first frequency band of the IF signals encoding the first message falls within a first Nyquist region, and a second frequency band of the IF signals encoding the second message falls within a second Nyquist region that is different from the first Nyquist region. Each Nyquist region is a range of frequencies that is bounded by two multiples of one-half of the sampling rate. By sampling the IF signals at a sufficiently low sampling rate (e.g., such that the first and second frequency bands fall in different Nyquist regions), a receiver can be designed using an ADC with a relatively low input bandwidth and a relatively low maximum sample clock rate. ADCs with low bandwidths and low maximum sampling rates are typically less expensive than ADCs with high bandwidths and high maximum sampling rates.

Figure 1:
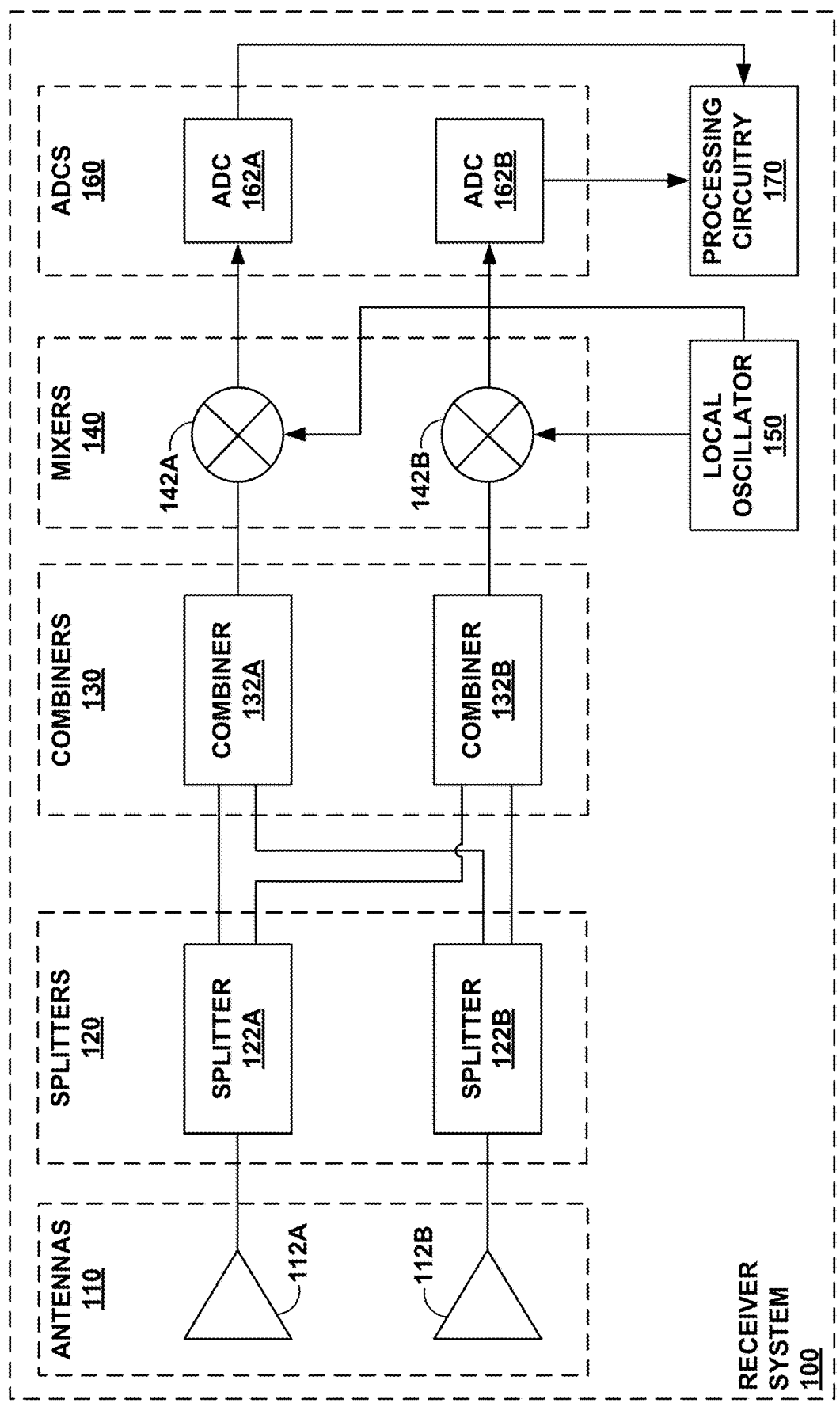
FIG. 1 is a conceptual block diagram of a receiver system, in accordance with some examples of this disclosure.

FIG. 1 is a conceptual block diagram of a receiver system 100, in accordance with some examples of this disclosure. FIG. 1 depicts receiver system 100 as including antennas 110, splitters 120, combiners 130, mixers 140, local oscillator 150, ADCs 160, and processing circuitry 170. In some examples, receiver system 100 may include additional components such as one or more filters (e.g., low-pass filters, bandpass filters, etc.), amplifiers (e.g., low-noise amplifiers), and/or switches. Additionally or alternatively, receiver system 100 may include fewer components than shown in FIG. 1. For example, receiver system 100 may include only one antenna, where the single antenna has multiple ports.

Receiver system 100 can be mounted on a vehicle or in a stationary environment, such as a traffic control center or a base station. Although this disclosure describes receiver systems for use in aircraft for ease of explanation, receiver system 100 can be used in any other vehicle or non-vehicle mobile object. In some examples, receiver system 100 may be configured to mount on an aircraft such as an unmanned aerial vehicle (UAV), an airplane, a helicopter, or a weather balloon. Receiver system 100 may be configured to mount on space vehicles such as satellites or spaceships, land vehicles such as automobiles, and/or water vehicles such as ships or submarines. Receiver system 100 may be configured to mount on manned vehicles or unmanned vehicles, such as drones, remote-control vehicles, urban air mobility (UAM) systems, or any suitable vehicle with or without a pilot or crew on board.

In the example shown in FIG. 1, antennas 110 include antennas 112A-112B, however receiver system 100 may include any number of antennas. In some examples, one of antennas 110 may be positioned at a first location on a vehicle (e.g., on top of the vehicle), and another of antennas 110 may be positioned at a second location on the vehicle (e.g., underneath the vehicle). Antenna 110 may be capable of transmitting and receiving RF signals in some examples. One or more switches (not shown in FIG. 1) may be coupled to each of antennas 110 to alternately connect an antenna to receiver system 100 or a transmitter system to allow for transmitting and receiving via the same antennas. In addition, each antenna may include one or more ports or terminals for routing signals. For example, splitter 122A may be configured to receive signals from a first port (e.g., a primary port) of antenna 112A, and splitter 122B may be configured to receive signals from a second port (e.g., a secondary port) of antenna 112A.

Each of antennas 110 can include one or more antenna elements configured to receive RF energy (e.g., messages encoded in L-band signals). Antennas 110 may include patch antennas integrated onto a circuit board, top-hat antennas, phased-array antennas, and/or any other type of antenna elements. Additional example details of antennas in a receiver system are described in commonly assigned U.S. patent application Ser. No. 16/568,708, entitled "Multi-Element Antenna Array with Integral Comparison Circuit for Phase and Amplitude Calibration," filed on Sep. 12, 2019, and U.S. patent application Ser. No. 16/850,343, entitled "Simplified TCAS Surveillance," filed on Apr. 16, 2020, the entire contents of each of which are incorporated herein by reference.

Antennas 110 may be configured to receive surveillance messages, where each surveillance message is encoded in a frequency band. The surveillance messages can include data packets of any form of position reporting protocol, including automatic-dependent surveillance-broadcast (ADS-B), traffic collision avoidance system (TCAS), transponder protocol, universal access transceiver (UAT), automatic identification system (AIS), and/or any other type of position reporting, including a reporting protocol for automobiles. Additional example details of antennas in a receiver system are described in commonly assigned U.S. patent application Ser. No. 16/892,029, entitled "Interference Limiting for Surveillance Messages," filed on Jun. 3, 2020, the entire contents of which are incorporated herein by reference.

Each surveillance message may include a data packet or a payload with data such as the location and/or velocity of the transmitting entity, where the location may include the latitude, longitude, and altitude of a vehicle. The data in each packet may also include information such as the origin and destination, the heading, and the type (e.g., Boeing 737, Airbus A320, Freightliner CL, DJI Phantom, etc.) of transmitting entity. Each surveillance message may be a periodic, unprompted broadcast, an interrogation message, and/or a reply to an interrogation message.

Antennas 110 may be capable of receiving surveillance messages from vehicles and/or non-moving entities, such as base stations or traffic control systems. Example traffic control systems include Air Traffic Controller systems and autonomous vehicle traffic management systems. In some examples, antennas 110 are also capable of transmitting surveillance messages. For example, receiver system 100 may include one or more switches (not shown in FIG. 1) that are configured to connect antennas 112A and/or 112B alternatively to a transmitter system or to receiver system 100. The switches for controlling receiving and transmission may be connected between antennas 110 and splitters 120.

Splitters 120 include splitter 122A configured to receive signals from antenna 112A and splitter 122B configured to receive signals from antenna 112B. In some examples, receiver system 100 may include one, two, or any number of splitters. For example, splitters 120 may include a first splitter for receiving signals from a primary port of antenna 112A and a second splitter for receiving signals from a secondary port of antenna 112A. Additionally or alternatively, splitters 120 may include one or more splitters for receiving signals from one or more ports of antenna 112B.

Each of splitters 122A and 122B can include a diplexer, triplexer, and/or quadplexer for generating two, three, or four separate signals. A splitter may include one or more bandpass filters for generating each separate band-limited signal. Each of splitters 122A and 122B may include an off-the-shelf splitter, a customized splitter, and/or an adjustable splitter. For example, a surface acoustic wave (SAW) filter triplexer splitter can include a first filter with a passband that encompasses the UAT frequency band, a second filter with a passband that encompasses the transponder frequency band, and a third filter with a passband that encompasses the TCAS frequency band. Each of splitters 122A and 122B and combiners 132A and 132B can include one or more SAW filters such as TA2003A, TA2002A and/or TA0689A manufactured by Tai-Saw Technology Co. in Taoyuan, Taiwan. In some examples, the frequency band for encoding UAT messages is one MHz wide centered on 978 MHz, the frequency band for encoding transponder messages is six MHz wide centered on 1030 MHz, and the frequency band for encoding TCAS messages is six MHz wide centered on 1090 MHz, according to governmental regulations and/or industry standards. Thus, the passband for each output of a splitter can be chosen based on relative governmental regulations and/or industry standards. Although UAT, transponder, and TCAS are given as example frequency bands, a triplexer splitter may be configured to output three signals in any three frequency bands.

Combiners 130 are configured to receive separate signals from splitters 120. Each of combiners 132A and 132B can include a reverse diplexer, a reverse triplexer, and/or a reverse quadplexer for combining or adding two, three, or four separate signals. In the example shown in FIG. 1, combiner 132A is configured to receive a separate signal from each of splitters 122A and 122B, and combiner 132B is configured to receive a separate signal from each of splitters 122A and 122B. However, other routing arrangements are possible for splitters 120 and combiners 130, including the routing arrangements shown in FIGS. 2-4.

Mixers 140 receive the combined signals outputted by combiners 130 and down-convert the combined signals from an RF frequency range to an IF frequency range based on the signal received from local oscillator 150. Mixer 142A may be configured to output a down-converted signal with a frequency spectrum that is equal to the frequency spectrum of the combined signal outputted by combiner 132A minus the frequency of the signal received from local oscillator 150. The frequency of local oscillator 150 may be higher or lower than the frequency ranges that encode the surveillance messages received by antennas 110.

Local oscillator 150 may include a frequency synthesizer, a crystal oscillator, or any other element capable of generating an oscillating signal. In some examples, local oscillator 150 may include a tunable oscillator configured to modulate the frequency of the oscillating signal based on control signals received from processing circuitry 170. An example frequency synthesizer that can be used as local oscillator 150 is the ADF4252 chip manufactured by Analog Devices, Inc. of Norwood, Mass. Additional example details of tunable local oscillators are described in commonly assigned U.S. Pat. No. 7,688,243, entitled "Method and System for Receiving Distance Measurement Equipment Channels in an Under-sampled Broadband Receiver," issued on Mar. 30, 2010, the entire contents of which are incorporated herein by reference.

In examples in which receiver system 100 demodulates UAT, transponder, and TCAS signals, local oscillator 150 may generate an oscillating signal with a frequency less than 977 MHz or greater than 1093 MHz. In some examples, a frequency of local oscillator 150 may be 899 MHz, 820 MHz, or 1.4 GHz. The frequency of local oscillator 150 may be within a range that allows for no overlap among aliases or images of the IF signals within a lowest Nyquist region, such as in a range of 810 MHz to 830 MHz, a range of 840 MHz to 850 MHz, a range of 860 MHz to 880 MHz, or a range of 890 MHz to 910 MHz.

ADCs 160 are configured to sample the down-converted signals outputted by mixers 140. In some examples, receiver system 100 may include the same number of ADCs and mixers such that each of ADCs 160 sample the output of a respective one of mixers 140. ADCs 160 may be configured to sample signals at a rate of 50, 100, or 200 MHz. In some examples, ADCs may have a maximum sampling rate that is less than 220 MHz, less than 110 MHz, or less than 60 MHz. A dual- or quad-ADC package can be used to reduce the cost, size, and weight of receiver system 100. An example dual-ADC package is the AD9648B chip manufactured by Analog Devices.

Processing circuitry 170 is configured to determine data in surveillance messages based on the output of the ADCs 160. Processing circuitry 170 may include any suitable arrangement of hardware, software, firmware, or any combination thereof, to perform the techniques attributed to processing circuitry 170 herein. Examples of processing circuitry 170 include any one or more microprocessors, digital signal processors (DSPs), application specific integrated circuits (ASICs), field programmable gate arrays (FPGAs), or any other equivalent integrated or discrete logic circuitry, as well as any combinations of such components. In some examples, processing circuitry 170 may include an FPGA such as the XC7A200T manufactured by Xilinx of San Jose, Calif. When processing circuitry 170 includes software or firmware, processing circuitry 170 further includes any hardware for storing and executing the software or firmware, such as one or more processors or processing units. In some examples, processing circuitry 170 is configured to operate at the same rate as ADCs 160. In other words, the clock speed of processing circuitry 170 may be equal to the sampling rate of ADCs 160.

In general, a processing unit may include one or more microprocessors, DSPs, ASICs, FPGAs, or any other equivalent integrated or discrete logic circuitry, as well as any combinations of such components. Processing circuitry 170 may be communicatively coupled to memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to processing circuitry 170 (e.g., may be external to a package in which processing circuitry 170 is housed).

In accordance with the techniques of this disclosure, receiver system 100 can use splitters 120 and combiners 130 to route separate signals to mixers 140 and ADCs 160. For example, industry standards and/or governmental regulations may mandate that, for a first surveillance protocol (e.g., transponder), receiver system 100 use signals received from the primary port of antenna 112A and from a primary port of antenna 112B. In addition, industry standards and/or governmental regulations may mandate that, for a second surveillance protocol (e.g., TCAS), receiver system 100 use signals received from the primary and secondary ports of antenna 112A or from the primary and secondary ports of antenna 112B. The arrangements of receiver systems 100, 200, 300, and 400 shown in FIGS. 1-4 can satisfy the antenna diversity requirements in the standards and regulations while minimizing the number of signal processing paths.

Figure 2:
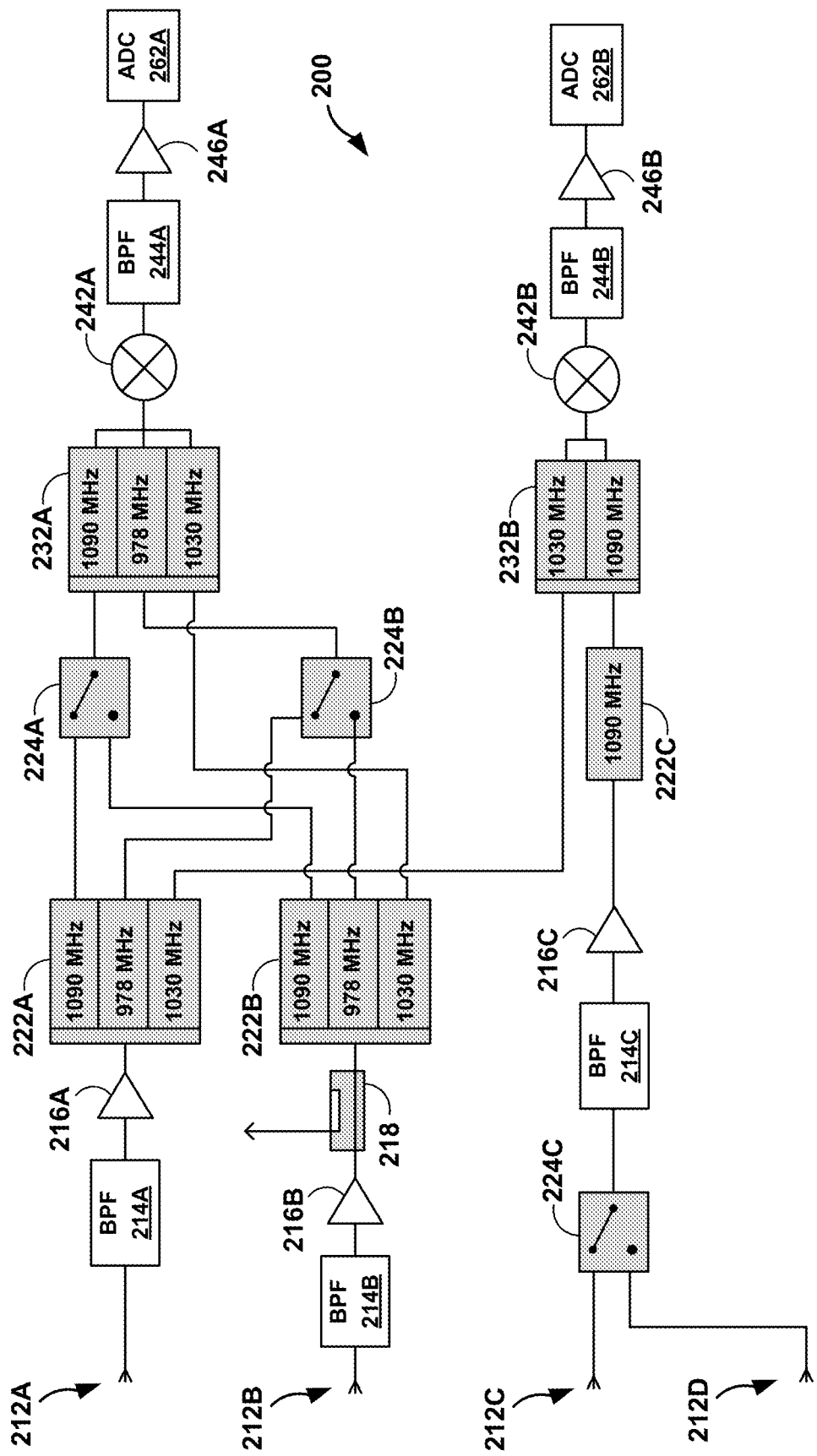
FIGS. 2-4 are conceptual block diagrams showing three example arrangements of splitters and combiners in a receiver system, in accordance with some examples of this disclosure.
Figure 3:
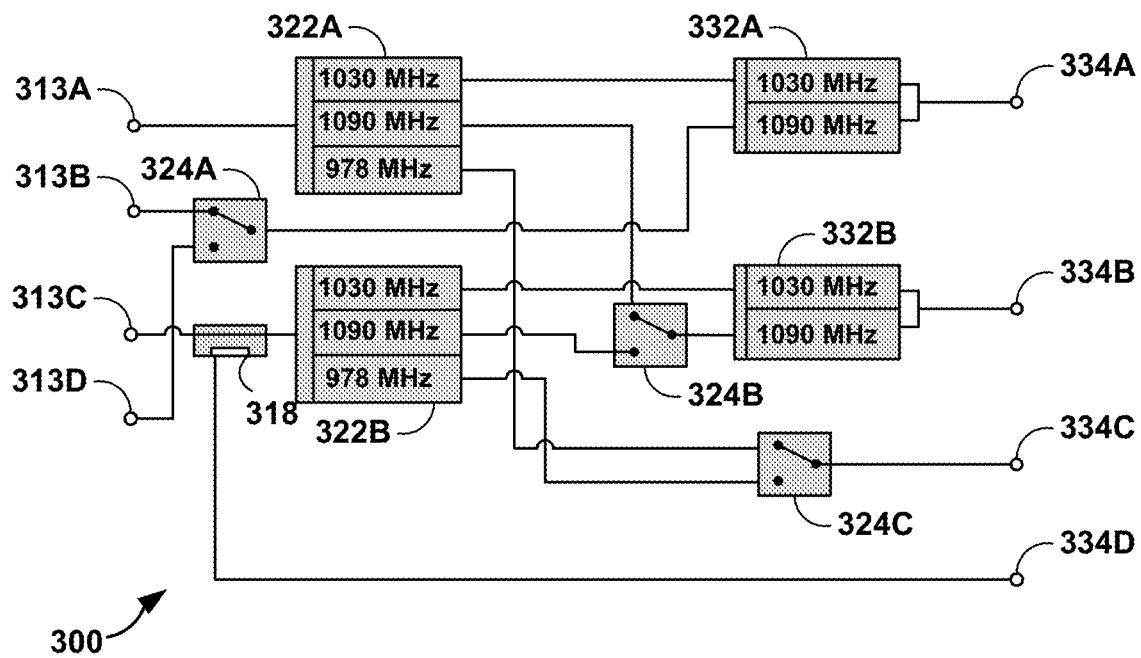
Figure 4:
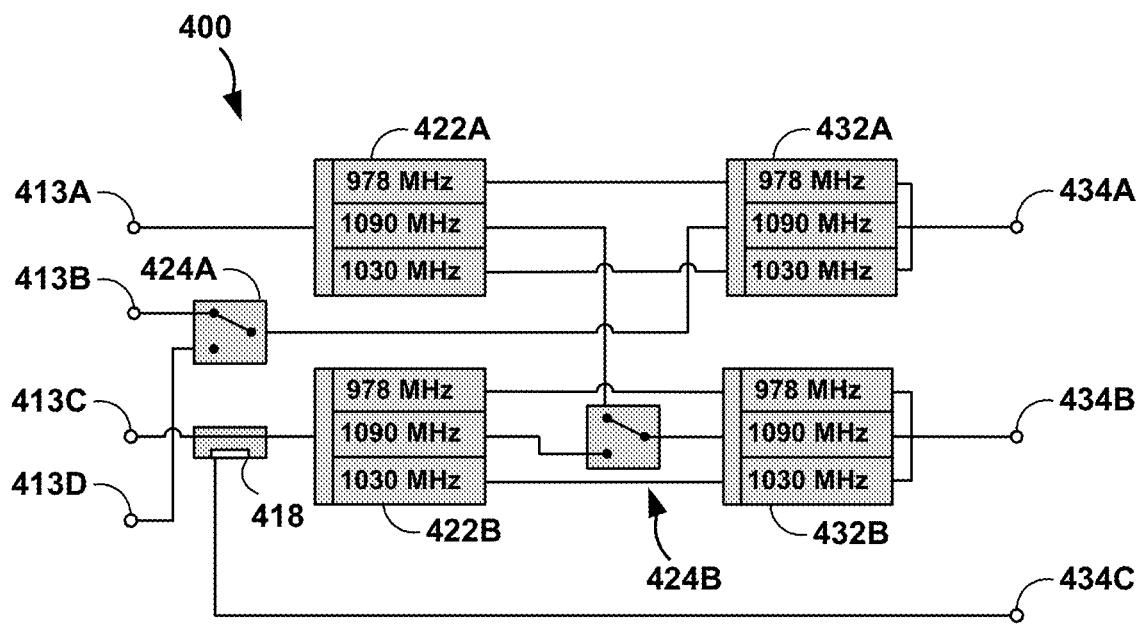

Processing circuitry 170 may be configured to control switches (not shown in FIG. 1) to effectively choose between antenna 112A and 112B and/or between ports on antenna 112A or 112B. Switches 224A-224C, 324A-324C, 424A, and 424B shown in FIGS. 2-4 are examples of switches for routing signals from antennas to mixers. For example, processing circuitry 170 can route a first signal from antenna 112A to mixer 142A and route a second signal from antenna 112B to mixer 142B by controlling the switches. Alternatively, processing circuitry 170 can route a first signal from a first port of antenna 112A to mixer 142A and route a second signal from a second port of antenna 112A to mixer 142B by controlling the switches. Each surveillance protocol (TCAS, transponder, UAT, etc.) has different requirements for receive scheduling and transmit scheduling.

The arrangement of splitters 120 and combiners 130 may allow for a single ADC to sample signals encoding messages in one or more frequency bands. For example, without any combiners 130, a larger number of ADCs 160 would be needed to sample all of the separate signals generated by splitters 120. Integration of multiple functions in a single avionics unit can be difficult while maintaining a small form factor, meeting minimum operational performance standards, and minimizing the number of components and circuit boards in the avionics unit. Existing receiver systems may include a separate receive chain and/or a separate line-replaceable-unit (LRU) for each of TCAS, transponder, UAT, and distance measuring equipment (DME). By integrating three or more functions into a single receiver system 100, the LRU footprint can be reduced compared to an existing system with discrete receive chains for each function or for each separate signal.

An existing aircraft may need up to four different radio systems and possibly up to four separate antennas to implement TCAS, ATC transponder, DME, and UAT avionics functions. Using four separate radio systems, however, can entail up to four different transceivers, which is not optimal in terms of weight, cost, volume, and power consumption. Some other existing L-band receiver systems can combine the functionality of one or more of a DME receiver, a TCAS receiver, a transponder, and a UAT receiver, but no existing system uses splitters and combiners in the arrangements described in this disclosure.

Receiver system 100 may include less expensive and less complex circuitry than other systems capable of demodulating messages of three or more communication protocols. Routing signals for multiple surveillance protocols upstream of mixers 140 may involve simpler circuitry and design, as compared to using splitters and combiners downstream of mixers 140. Arranging the splitters and combiners downstream of mixers 140 (e.g., in the IF domain) can result in increased spurious frequency issues, as compared to splitting and combining as shown in FIG. 1 (e.g., in the RF domain). A system with splitters and combiners downstream of mixers 140 may include larger-size filters than the filters that can be used by receiver system 100 because the physical size of a low-frequency filter is generally larger than the physical size of a high-frequency filter. In addition, sampling RF signals without any down-conversion (e.g., direct RF sampling) requires ADCs with a very high bandwidth, which are much more expensive than lower-bandwidth ADCs. For example, a digital section with an input bandwidth of 1.4 GHz may cost several hundred dollars, while a digital section with an input bandwidth of 100 MHz may cost under one hundred dollars.

FIGS. 2-4 are conceptual block diagrams showing three example arrangements of splitters and combiners in a receiver system, in accordance with some examples of this disclosure. In the example shown in FIG. 2, antennas 212A-212D are connected to bandpass filters 214A-214C. Although antennas 212A-212D are depicted as separate antennas, antennas 212A and 212C may be two ports of a first antenna, and antennas 212B and 212D may be two ports of a second antenna. Bandpass filters 214A-214C may be configured to filter signals in a band from 962 MHz to 1215 MHz or in a narrower band. For example, bandpass filter 214A may be configured to filter from 962 MHz to 1100 MHz, and bandpass filter 214C may be configured to filter around 1090 MHz (e.g., from 1080 MHz to 1100 MHz). Additionally or alternatively, the passbands of filters 214A-214C may encompass the L1 band (1575.42 MHz) and the L2 band (1227.60 MHz) for Global Positioning System signals.

Bandpass filters 214A-214C are connected to low-noise amplifiers (LNAs) 216A-216C. Coupler 218 may be configured to generate a signal for a receive chain for messages encoded in the DME frequency band. Although not shown in FIG. 2, receiver system 200 may also include a second coupler connected between LNA 21A and splitter 222A. The DME receive chain, which is not shown in FIG. 2, can include a mixer, a bandpass filter, an LNA, and an ADC. Splitters/filters 222A-222C receive the signals outputted by LNAs 216A-216C and are configured to generate separate signals. As depicted, filter 222C does not generate more than one separate signal, so filter 222C can include a single bandpass filter. Filter 222C is an optional component in receiver system 200, and the output of LNA 216C can be connected to an input of combiner 232B in examples without filter 222C. The separate signals generated by splitters/filters 222A and 222B are routed to switches 224A and 224B, and the transponder-band separate signal generated by splitter 222B is routed to combiner 232A. FIG. 2 depicts filters 214C and 222C and LNA 216C as connected to the output of switch 224C, but alternatively a first set of filters and amplifier(s) may be connected to a first input of switch 224C (e.g., between antenna 212C and switch 224C) and a second set of filters and amplifier(s) may be connected to a second input of switch 224C (e.g., between antenna 212D and switch 224C).

In the example shown in FIG. 2, splitters 222A and 222B are triplexers, and filter 222C is a single bandpass filter. Although UAT (e.g., 978 MHz), transponder (e.g., 1030 MHz), and TCAS (e.g., 1090 MHz) are depicted in FIGS. 2-4, the techniques of this disclosure may be used for any other signal protocols, including other communication protocols and surveillance protocols such as ADS-B, DME, or AIS.

In the example shown in FIG. 2, splitter 222A is configured to generate and deliver a separate signal in a first frequency band (e.g., 978 MHz) to switch 224B, generate and deliver a separate signal in a second frequency band (e.g., 1030 MHz) to combiner 232B, and generate and deliver a separate signal in a third frequency band (e.g., 1090 MHz) to switch 224A. Splitter 222B is configured to generate and deliver a separate signal in the first frequency band to switch 224B, generate and deliver a separate signal in the second frequency band to combiner 232A, and generate and deliver a separate signal in a third frequency band to switch 224A. Filter 222C is configured to generate and deliver a separate signal in the third frequency band to combiner 232B.

In the example shown in FIG. 2, switch 224A is configured to receive signals in the third frequency band from splitters 222A and 222B and deliver one of the received signals to combiner 232A. In examples in which antenna 212A is a primary port of a top antenna and antenna 212B is a primary port of a bottom antenna, switch 224A may be configured to switch between signals received in the third frequency band by the top and bottom antennas. In the example shown in FIG. 2, switch 224B is configured to receive signals in the first frequency band from splitters 222A and 222B and deliver one of the received signals to combiner 232A. Switch 224A may be configured to switch between signals received in the first frequency band by the top and bottom antennas.

In the example shown in FIG. 2, switch 224C is configured to receive signals from antennas 212C and 212D and deliver one of the received signals to bandpass filter 214C. In examples in which antenna 212C is a secondary port of a top antenna and antenna 212D is a secondary port of a bottom antenna, switch 224C may be configured to switch between signals received in the third frequency band by the top and bottom antennas. In examples in which antenna 212C is a secondary port of a first antenna and antenna 212D is a secondary port of a second antenna, switch 224C may be configured to switch between signals received by ports of two different antennas. Each of switches 224A-224C may include a single pole double throw switch for delivering one of two inputs to the output.

In the example shown in FIG. 2, combiner 232A is a reverse triplexer, and combiner 232B is a reverse duplexer. Combiner 232A may be configured to receive a separate signal in the first frequency band from switch 224B, a separate signal in the second frequency band from splitter 222B, and a separate signal in the third frequency band from switch 224A. Combiner 232B may be configured to receive a separate signal in the second frequency band from splitter 222A and a separate signal in the third frequency band from filter 222C. Combiners 232A and 232B may be configured to filter the received signals and generate a combined signal that sums the filtered signals. In some examples, an LNA may be connected to the output of combiners 232A and 232B (e.g., between a respective combiner and mixer).

Mixers 242A and 242B may be configured to down-convert the signals received from combiners 232A and 232B based on a local oscillator. Each of mixers 242A and 242B may be configured to generate a summed signal and a subtracted signal. The summed signal represents a frequency sum of the signal received from the respective combiner and the local oscillator signal. The subtracted signal represents a frequency difference of the signal received from the respective combiner and the local oscillator signal.

Bandpass filters 244A and 244B may be configured to filter the signals outputted by mixers 242A and 242B to generate IF signals. Bandpass filters 244A and 244B may be configured to filter for one or more Nyquist regions, where each Nyquist region has a frequency bandwidth equal to one-half of the sampling rate of ADCs 262A and 262B. In examples in which the local oscillator has a frequency of 899 MHz, bandpass filters 244A and 244B may have passbands centered on 79, 131, and 191 MHz for UAT, transponder, and TCAS messages, respectively. In examples in which ADCs 262A and 262B have a sampling rate of one hundred MHz, each Nyquist region may extend across fifty MHz.

Figure 7:
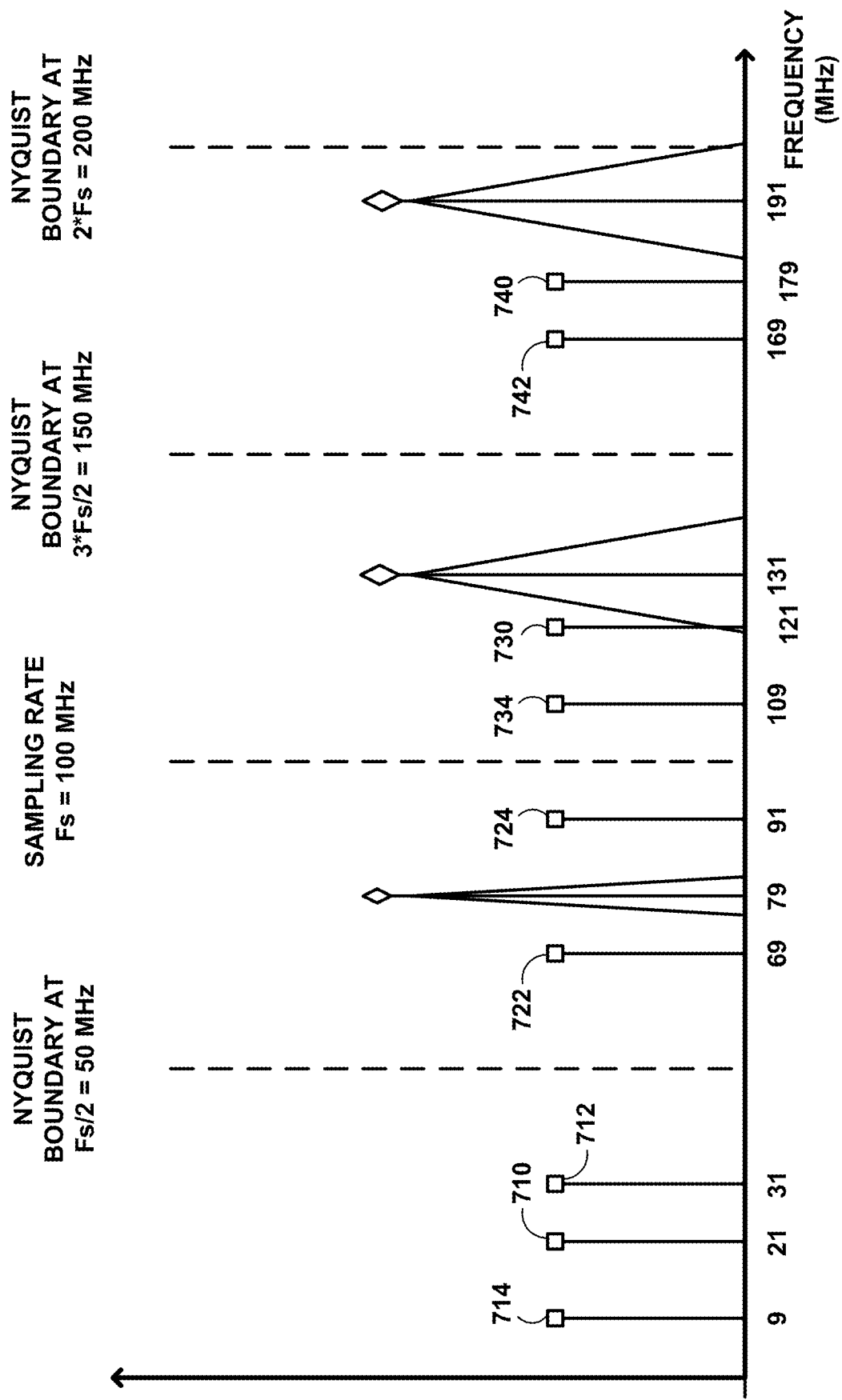
FIGS. 7 and 8 are diagrams of example frequency spectrums for down-converted signals, in accordance with some examples of this disclosure.
Figure 8:
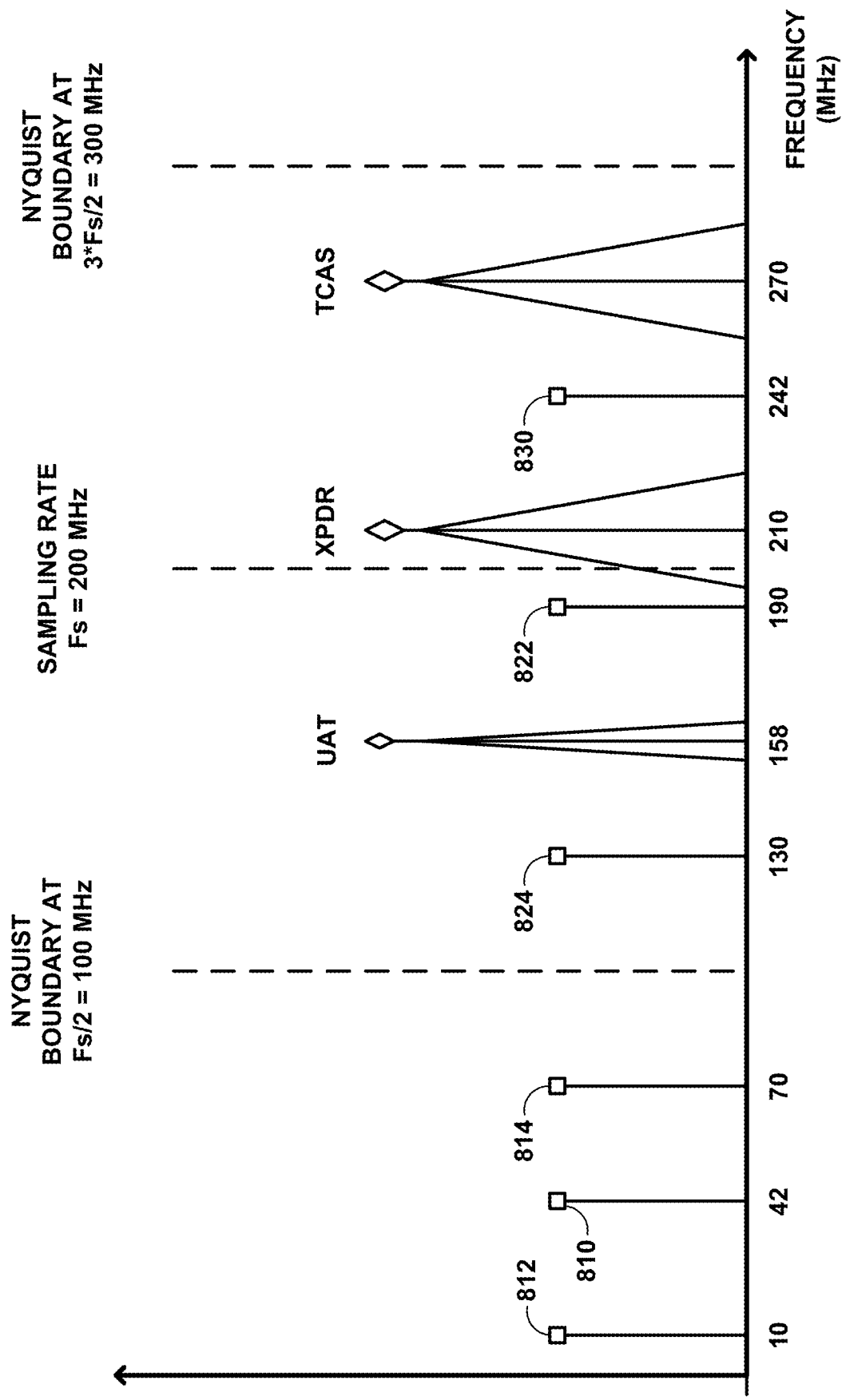

Bandpass filters 244A and 244B may include triplexer(s) and/or duplexer(s) with multiple bandwidths of approximately ten MHz centered around each of the IF frequencies. Each of bandpass filters 244A and 244B may be configured to reject frequency bands in other Nyquist regions that would fold into frequency bands of interest in other Nyquist regions. For example, bandpass filter 244A may be configured to filter signals around 79 MHz, 131 MHz, and 191 MHz, as shown in the example of FIG. 7, or filter signals around 158 MHz, 210 MHz, and 270 MHz, as shown in the example of FIG. 8. Thus, bandpass filters 244A and 244B may be configured to reject noise in other Nyquist regions as well as other signals. Noise folding decreases the signal-to-noise ratio in receiver system 200. All of the down-converted signals encoding message in the three frequency bands either may be within the filtered bandwidth or may have an image or alias within the filtered bandwidth.

LNAs 246A and 246B are configured to amplify the bandpass-filtered signals for sampling by ADCs 262A and 262B. In some examples, the order or position of bandpass filters 244A and 244B and LNAs 246A and 246B may be reversed such that LNAs 246A and 246B are connected to the outputs of mixers 242A and 242B and bandpass filters 244A and 244B are connected to the outputs of LNAs 246A and 246B. ADCs 262A and 262B may be configured to sample the signals outputted by LNAs 246A and 246B. In some examples, a single package may house both of ADCs 262A and 262B. Receiver system 200 may include processing circuitry configured to determine the data encoded in surveillance messages received by antennas 212A-212D.

The signal processing path that includes ADC 262A can be used for monitoring messages encoded in the first frequency band received by antennas 212A and 212B, messages encoded in the second frequency band received by antenna 212B, and messages encoded in the third frequency band received by antennas 212A and 212B. The signal processing path that includes ADC 262B can be used for monitoring messages encoded in the second frequency band received by antennas 212A and 212C and messages encoded in the third frequency band received by antennas 212C and 212D.

FIG. 3 depicts an example receiver system 300 including coupler 318, splitters 322A and 322B, switches 324A-324C, and combiners 332A and 332B. In the example shown in FIG. 3, receiver system 300 includes fewer splitters and fewer switches than receiver system 200 shown in FIG. 2.

Receiver system 300 may include three mixers for the three frequency bands, along with an additional mixer for DME, whereas receiver systems 200 and 400 can include two mixers for the three frequency bands. Thus, receiver system 300 includes more signal processing paths but less circuitry for splitting and combining RF signals.

In the example shown in FIG. 3, nodes 313A-313D may be configured to receive RF signals from antennas. For example, nodes 313A and 313B may be configured to receive RF signals from two ports of a first antenna, and nodes 313C and 313D may be configured to receive RF signals from two ports of a second antenna. Coupler 318 may be configured to generate a signal for a receive chain for messages encoded in the DME frequency band. Node 334D may be configured to connect to the DME receive chain. Additional example details of receive chains for demodulating surveillance messages are described in commonly assigned U.S. Pat. No. 8,593,330, entitled "Multichannel, Multimode, Multifunction L-Band Radio Transceiver," issued on Nov. 26, 2013, the entire contents of which are incorporated herein by reference.

Splitters 322A and 322B are configured to receive signals from nodes 313A and 313C, which may be connected to the primary ports of two antennas. The separate signals generated by splitters 322A and 322B are routed to switches 324B and 324C and combiners 332A and 332B. In the example shown in FIG. 3, splitters 322A and 322B are triplexers. Splitter 322A is configured to generate and deliver a separate signal in a first frequency band to switch 324C, generate and deliver a separate signal in a second frequency band to combiner 332A, and generate and deliver a separate signal in a third frequency band to switch 324B. Splitter 322B is configured to generate and deliver a separate signal in the first frequency band to switch 324C, generate and deliver a separate signal in the second frequency band to combiner 332B, and generate and deliver a separate signal in the third frequency band to switch 324B.

Switch 324A is configured to receive signals in the third frequency band from nodes 313B and 313D and deliver one of the received signals to combiner 332A. Switch 324B is configured to receive signals in the third frequency band from splitters 322A and 322B and deliver one of the received signals to combiner 332B. Switch 324C may be configured to receive signals in the first frequency band from splitters 322A and 322B and deliver one of the received signals to node 334C. In the example shown in FIG. 3, combiners 332A and 332B are reverse duplexers. Combiner 332A may be configured to receive a separate signal in the second frequency band from splitter 322A and a separate signal in the third frequency band from switch 324A. Combiner 332B may be configured to receive a separate signal in the second frequency band from splitter 322B and a separate signal in the third frequency band from switch 324B. Combiners 332A and 332B may be configured to output combined signals to nodes 334A and 334B, respectively.

The signal processing path that includes node 334A can be used for monitoring messages encoded in the second frequency band received by an antenna connected to node 313A and messages encoded in the third frequency band received by antennas connected to nodes 313B and 313D. The signal processing path that includes node 334B can be used for monitoring messages encoded in the second frequency band received by an antenna connected to node 313C and messages encoded in the third frequency band received by antennas connected to nodes 313A and 313C. The signal processing path that includes node 334C can be used for monitoring messages encoded in the first frequency band received by antennas connected to nodes 313A and 313C.

FIG. 4 depicts an example receiver system 400 including coupler 418, splitters 422A and 422B, switches 424A and 424B, and combiners 432A and 432B. In the example shown in FIG. 4, nodes 413A-413D may be configured to receive RF signals from antennas. For example, nodes 413A and 413B may be configured to receive RF signals from two ports of a first antenna, and nodes 413C and 413D may be configured to receive RF signals from two ports of a second antenna. Coupler 418 may be configured to generate a signal for a receive chain for messages encoded in the DME frequency band. Node 434D may be configured to connect to the DME receive chain. Splitters 422A and 422B are configured to receive signals from nodes 413A and 413C, which may be connected to the primary ports of two antennas. The separate signals generated by splitters 422A and 422B are routed to switch 424B and combiners 432A and 432B.

In the example shown in FIG. 4, splitters 422A and 422B are triplexers. Splitter 422A is configured to generate and deliver a separate signal in a first frequency band to combiner 432A, generate and deliver a separate signal in a second frequency band to combiner 432A, and generate and deliver a separate signal in a third frequency band to switch 424B. Splitter 422B is configured to generate and deliver a separate signal in the first frequency band to combiner 432A, generate and deliver a separate signal in the second frequency band to combiner 432A, and generate and deliver a separate signal in the third frequency band to switch 424B.

Switch 424A is configured to receive signals in the third frequency band from nodes 413B and 413D and deliver one of the received signals to combiner 432A. Switch 424B is configured to receive signals in the third frequency band from splitters 422A and 422B and deliver one of the received signals to combiner 432B. In the example shown in FIG. 4, combiners 432A and 432B are reverse triplexers. Combiner 432A may be configured to receive separate signals in the first and second frequency bands from splitter 422A and a separate signal in the third frequency band from switch 424A. Combiner 432B may be configured to receive separate signals in the first and second frequency bands from splitter 422B and a separate signal in the third frequency band from switch 424B. Combiners 432A and 432B may be configured to output combined signals to nodes 434A and 434B, respectively.

The signal processing path that includes node 434A can be used for monitoring messages encoded in the first frequency band received by an antenna connected to node 413A, messages encoded in the second frequency band received by an antenna connected to node 413A, and messages encoded in the third frequency band received by antennas connected to nodes 413B and 413D. The signal processing path that includes node 434B can be used for monitoring messages encoded in the first frequency band received by an antenna connected to node 413C, messages encoded in the second frequency band received by an antenna connected to node 413C, and messages encoded in the third frequency band received by antennas connected to nodes 413A and 413C.

Figure 5:
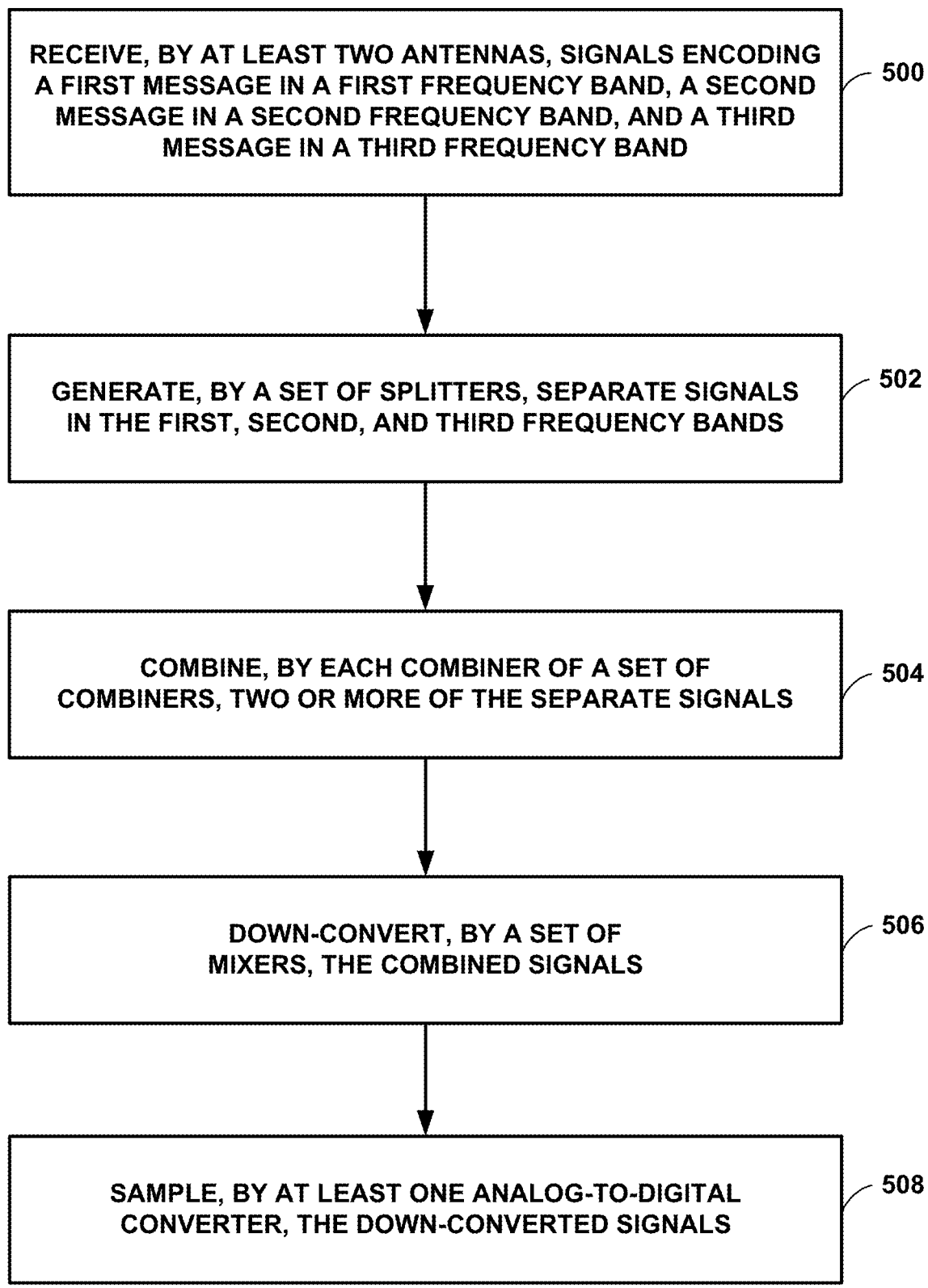
FIG. 5 is a flowchart illustrating an example process for demodulating surveillance signals, in accordance with some examples of this disclosure.

FIG. 5 is a flowchart illustrating an example process for demodulating surveillance signals, in accordance with some examples of this disclosure. The example process of FIG. 5 is described with reference to receiver system 100 shown in FIG. 1, although other components may exemplify similar techniques.

In the example of FIG. 5, antennas 110 receive signals encoding a first message in a first frequency band, a second message in a second frequency band, and third message in a third frequency band (500). The frequency bands may correspond to UAT, transponder, TCAS, DME, and/or any other communication protocol. In examples in which receiver system 100 is mounted on an aircraft, the receive processing for UAT messages can be accomplished using a port connection of either or both of antennas 112A and 112B. The receive processing for transponder messages can be accomplished using a port connection of either or both of antennas 112A and 112B. The receive processing for TCAS messages can be accomplished by simultaneously using two port connections of from either of antennas 112A and 112B. The receive processing for DME messages can be accomplished, for example, by simultaneously using two port connections of from either of antennas 112A and 112B. Receiver system 100 can include two coupler for generating two separate signals for DME processing, which can allow for redundancy in demodulating DME messages.

In the example of FIG. 5, splitters 120 generate separate signals in the first, second, and third frequency bands (502). Splitters 120 may be configured to generate one or more separate band-limited signals in RF bands for the communication protocols being used by receiver system 100. Each of combiners 130 combine two or more separate signals in the first, second, and third frequency bands (504). The combined signals may represent the sum of the separate signals received by the respective combiner.

In the example of FIG. 5, mixers 140 down-convert the combined signals (506). The down-conversion process involves generating IF signals that represent the frequency difference between the combined signal and the local oscillator. ADCs 160 then sample the down-converted signals (508) by converting the analog level of a down-converted signal to a digital number. Processing circuitry 170 can receive and process the digital numbers outputted by ADCs 160 to determine the data in the messages that are encoded in the signals received by antennas 110.

Figure 6:
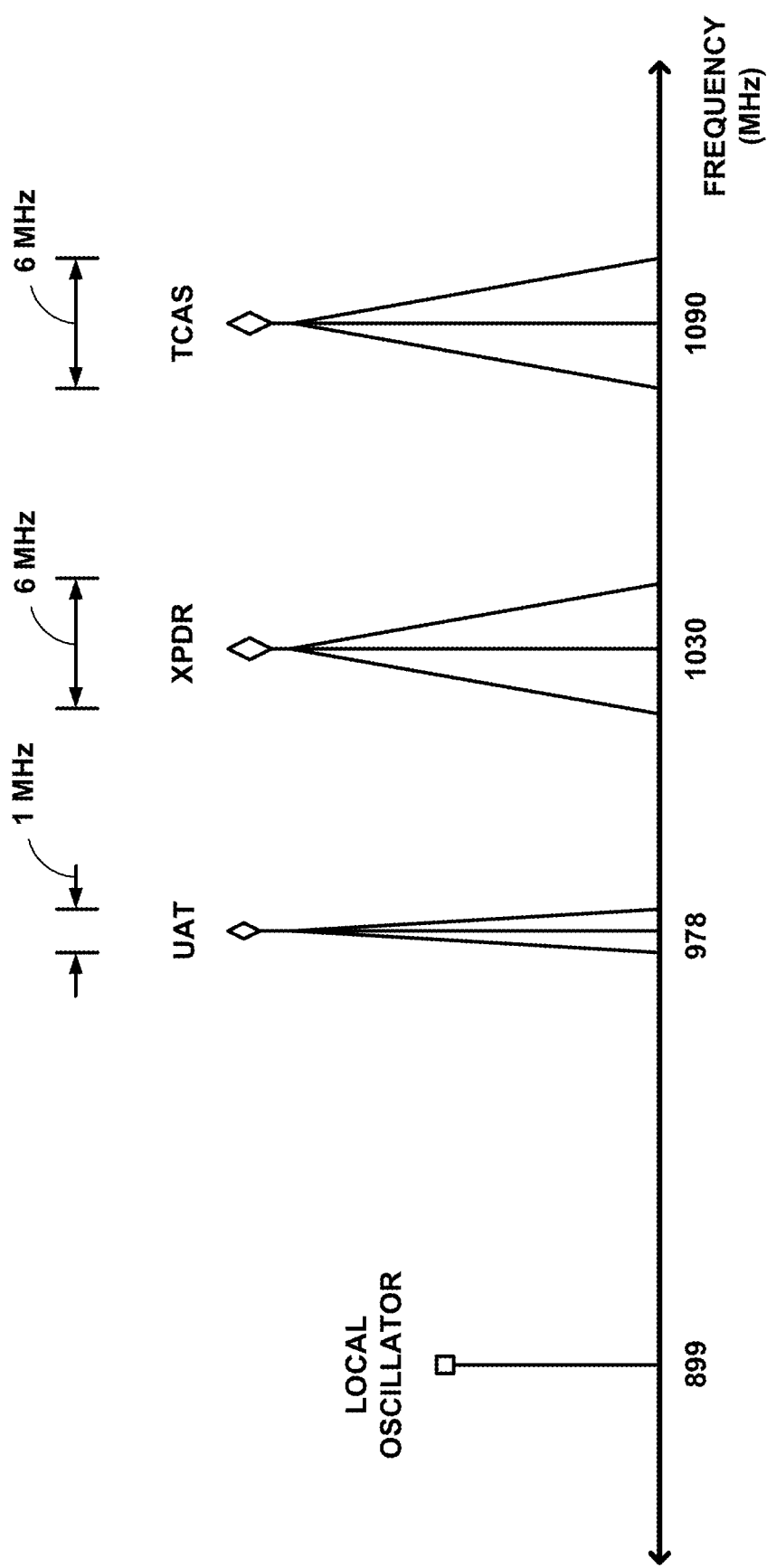
FIG. 6 is a diagram of an example frequency spectrum for radio-frequency signals and a local oscillator, in accordance with some examples of this disclosure.

FIG. 6 is a diagram of an example frequency spectrum for radio-frequency signals and a local oscillator, in accordance with some examples of this disclosure. Although FIG. 6 depicts a frequency spectrum including three example surveillance protocols (UAT, transponder, and TCAS), other communication protocols can be demodulated in a receiver system implementing the techniques of this disclosure. FIG. 6 also depicts a local oscillator frequency of 899 MHz, but other local oscillator frequencies can be implemented to demodulate UAT, transponder, and TCAS signals.

UAT messages may be encoded in a first frequency band of 977.5 MHz to 978.5 MHz, which has a bandwidth of one MHz. Transponder messages may be encoded in a second frequency band of 1027 MHz to 1033 MHz, which has a bandwidth of six MHz. TCAS messages may be encoded in a third frequency band of 1087 MHz to 1093 MHz, which has a bandwidth of six MHz.

A mixer may be configured to receive two input signals: a first input signal from the local oscillator and a second input signal from a combiner that includes the UAT, transponder, and/or TCAS frequency components shown in FIG. 6. In some examples, the second input signal may include only two of the three frequency components shown in FIG. 6. The mixer can generate a subtracted signal that represents the frequency difference between the two input signals. The subtracted signal can be referred to as an IF signal or a down-converted signal. For a local oscillator at 899 MHz, any UAT messages encoded in the IF signal will have frequency components centered on 79 MHz (978 minus 899), any transponder messages encoded in the IF signal will have frequency components centered on 131 MHz (1,030 minus 899), and any TCAS messages encoded in the IF signal will have frequency components centered on 191 MHz (1,090 minus 899).

FIGS. 7 and 8 are diagrams of example frequency spectrums for down-converted signals, in accordance with some examples of this disclosure. FIG. 7 shows the frequency components of an IF signal generated using a local oscillator at 899 MHz, and FIG. 8 shows the frequency components of an IF signal generated using a local oscillator at 820 MHz. FIG. 7 shows the Nyquist regions formed by sampling at a rate of 100 MHz, and FIG. 8 shows the Nyquist regions formed by sampling at a rate of 200 MHz. The power axes in FIGS. 7 and 8 have arbitrary units for visually differentiating the desired receive signals from the folding zones that are filtered out in other Nyquist regions.

In the example shown in FIG. 7, the first and lowest Nyquist region has a range from zero to 50 MHz, the second Nyquist region has a range from 50 to 100 MHz, the third Nyquist region has a range from 100 to 150 MHz, and the fourth Nyquist region has a range from 150 to 200 MHz, where zero MHz represents direct-current signals. The boundaries of each Nyquist region are multiples of one-half of the sampling rate of an ADC, where the sampling rate is 100 MHz in the example shown in FIG. 7.

Any UAT messages encoded in the IF signal depicted in FIG. 7 have frequency components centered on 79 MHz, any transponder messages encoded in the IF signal have frequency components centered on 131 MHz, and any TCAS messages encoded in the IF signal have frequency components centered on 191 MHz. The frequency components of the UAT messages fall within the second Nyquist region, the frequency components of the transponder messages fall within the third Nyquist region, and the frequency components of the TCAS messages fall within the fourth Nyquist region.

Moreover, in the example of FIG. 7, the sampling rate is less than two times the frequency components of the IF signals encoding the UAT, transponder, or TCAS messages. When the sampling rate is less than two times the frequency components of all of the encoded messages, none of these frequency components fall within the first and lowest Nyquist region.

The frequency components of each surveillance protocol that fall within a respective Nyquist region create images or aliases in other Nyquist regions. For example, by sampling at a rate of 100 MHz, the frequency components of UAT messages create alias 710 at 21 MHz in the first Nyquist region, alias 730 at 121 MHz in the third Nyquist region, and alias 740 at 179 MHz in the fourth Nyquist region. The frequency components of transponder messages create alias 712 at 31 MHz in the first Nyquist region, alias 722 at 69 MHz in the second Nyquist region, and alias 742 at 169 MHz in the fourth Nyquist region. The frequency components of TCAS messages create alias 714 at 9 MHz in the first Nyquist region, alias 724 at 91 MHz in the second Nyquist region, and alias 744 at 191 MHz in the fourth Nyquist region. The creation of aliases in other Nyquist regions is called folding because the aliases are symmetrical about frequency multiples of the sampling rate (e.g., zero Hz, 100 MHz, 200 MHz, etc.).

In the example shown in FIG. 7, the frequency components of each surveillance protocol fall in different Nyquist regions. In addition, aliases 710, 712, and 714 in the first Nyquist region do overlap because alias 714 has a range of six to twelve MHz, alias 710 has a range of 20.5 to 21.5 MHz, and alias 712 has a range of 28 to 34 MHz. No overlap among aliases 710, 712, and 714 allows for processing and demodulating UAT, transponder, and TCAS messages in a single path with a single ADC.

Over-sampling removes the possibility of overlap of aliases because all of the frequency components will occupy the lowest Nyquist region. However, over-sampling requires a much higher maximum sampling rate and therefore more expensive ADCs and processing circuitry. For example, a receiver system that oversamples down-converted UAT and TCAS signals needs a sampling rate of at least 231 MHz because the difference between the lower bound of the UAT band and the upper bound of the TCAS band is 115.5 MHz. An over-sampling system can filter out all but the lowest Nyquist region because all of the IF signals have frequency components that are less than one-half of the sampling rate. Thus, folding all of the IF signals into the lowest Nyquist region may be not needed for an over-sampling system.

Using under-sampling, the signals encoding multiple communication protocols fold into the first Nyquist region, and lower-speed ADCs and processing circuitry can be used. A sampled system may not be able to differentiate between different Nyquist regions and, as a result, sampled signals at frequencies higher than one-half of the sampling rate fold down in frequency and appear to the digital system to be in the first and lowest Nyquist region. In an under-sampling scenario, the IF signals may occupy different Nyquist regions and therefore selective narrow-band filtering can be implemented in the RF receive chain prior to down-conversion and ADC sampling. Processing circuitry can use the sampled aliases that exist in the first Nyquist region to determine data in the surveillance messages encoded in the RF signals.

In the example shown in FIG. 8, the sampling rate is 200 MHz. Thus, the first and lowest Nyquist region has a range from zero to 100 MHz, the second Nyquist region has a range from 100 to 200 MHz, and the third Nyquist region has a range from 200 to 300 MHz. The boundaries of each Nyquist region are multiples of one-half of the sampling rate of an ADC.

Any UAT messages encoded in the IF signal depicted in FIG. 8 have frequency components centered on 158 MHz, any transponder messages encoded in the IF signal have frequency components centered on 210 MHz, and any TCAS messages encoded in the IF signal have frequency components centered on 270 MHz. Thus, the frequency components of the UAT messages fall within the second Nyquist region, the frequency components of the transponder messages and the frequency components of the TCAS messages fall within the third Nyquist region.

Moreover, in the example of FIG. 8, the sampling rate is less than two times the frequency components of the IF signals encoding the UAT, transponder, or TCAS messages. When the sampling rate is less than two times the frequency components of all of the encoded messages, none of these frequency components fall within the first and lowest Nyquist region.

The frequency components of each surveillance protocol that fall within a respective Nyquist region create images or aliases in other Nyquist regions. For example, by sampling at a rate of 200 MHz, the frequency components of UAT messages create alias 810 at 42 MHz in the first Nyquist region and alias 830 at 242 MHz in the third Nyquist region. The frequency components of transponder messages create alias 812 at 10 MHz in the first Nyquist region and alias 822 at 190 MHz in the second Nyquist region. The frequency components of TCAS messages create alias 814 at 70 MHz in the first Nyquist region and alias 824 at 130 MHz in the second Nyquist region.

In the example shown in FIG. 8, the frequency components of the UAT messages fall in a different Nyquist region than the frequency components of the transponder and TCAS messages. In addition, aliases 810, 812, and 814 in the first Nyquist region do overlap because alias 812 has a range of seven to thirteen MHz, alias 810 has a range of 41.5 to 42.5 MHz, and alias 814 has a range of 67 to 73 MHz.

Figure 9:
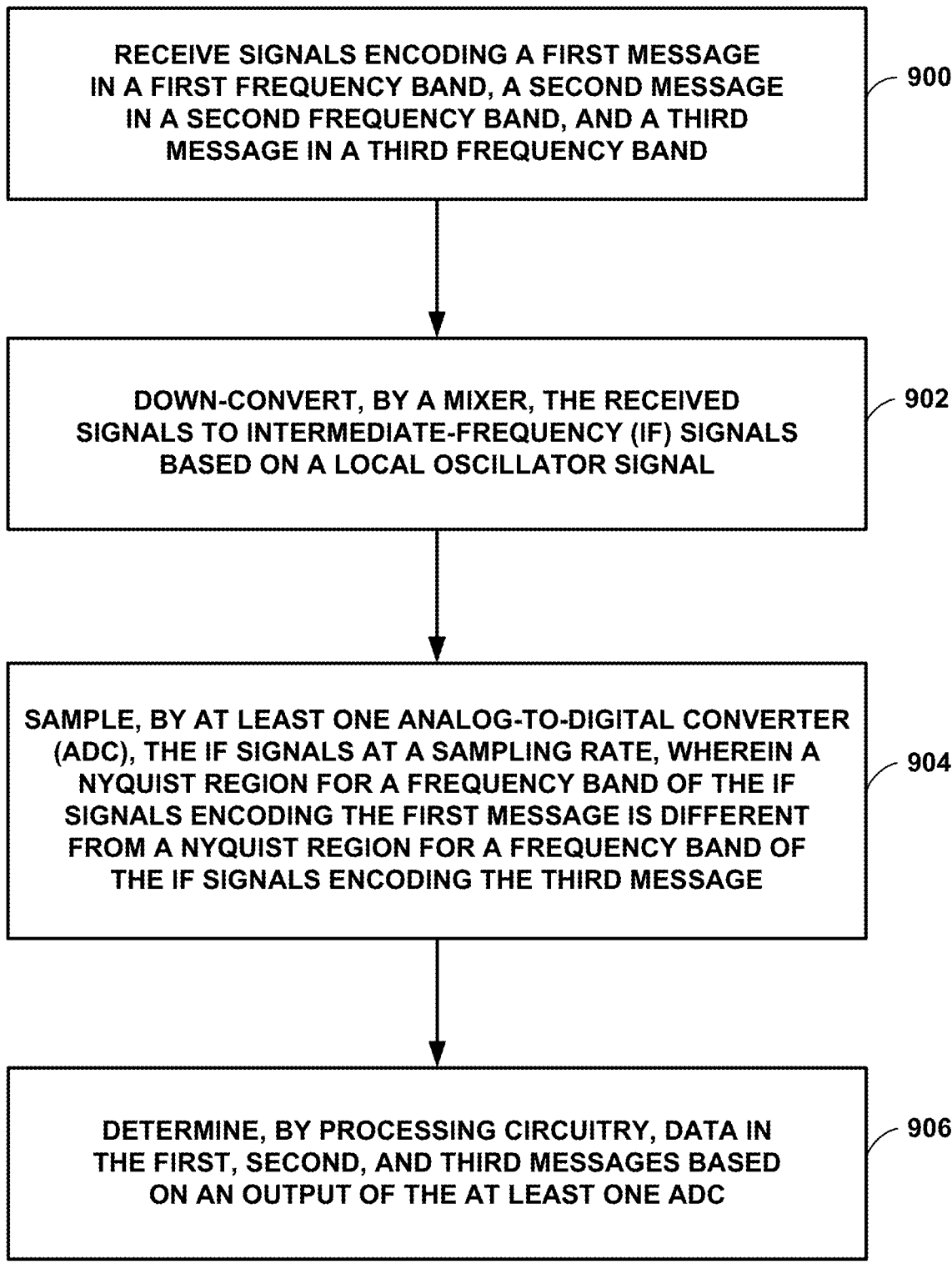
FIG. 9 is a flowchart illustrating an example process for sampling down-converted signals, in accordance with some examples of this disclosure.

FIG. 9 is a flowchart illustrating an example process for sampling down-converted signals, in accordance with some examples of this disclosure. The example process of FIG. 9 is described with reference to receiver system 100 shown in FIG. 1, although other components may exemplify similar techniques.

In the example of FIG. 9, receiver system 100 receives signals at antennas 110 encoding a first message in a first frequency band, a second message in a second frequency band, and third message in a third frequency band (900). The frequency bands may correspond to UAT, transponder, TCAS, DME, and/or any other communication protocol. Mixers 140 down-convert the received signals to IF signals based on a signal generated by local oscillator 150 (902). Mixers 140 generate down-converted signals with a frequency spectrum that represents the frequency spectrum of the RF signals minus the frequency of local oscillator 150.

In the example of FIG. 9, ADCs 160 sample the IF signals at a sampling rate (904). A Nyquist region for a frequency band of the IF signals encoding the first message is different from a Nyquist region for a frequency band of the IF signals encoding the third message. Separating the frequency bands encoding the first and third messages is achieved using narrower Nyquist regions, slower ADCs 160, and therefore less expensive digital equipment. At least two of the frequency bands of the messages may fall in different Nyquist regions, or receiver system 100 may be configured such that all of the frequency bands of the messages may fall in different Nyquist regions. Processing circuitry 170 then determines data in the first, second, and third messages based on an output of ADCs 160 (906). Processing circuitry 170 may be configured to rebuild the IF signals encoding the messages even when the IF signals are under-sampled.

The following numbered examples demonstrate one or more aspects of the disclosure.

Example 1. A method is for demodulating a first message in a first frequency band, a second message in a second frequency band, and a third message in a third frequency band, wherein the first, second, and third frequency bands are non-overlapping bands. The method includes receiving, by at least two antennas, signals encoding the first, second, and third messages and generating, by each splitter of a set of splitters, separate signals in the first, second, and third frequency bands. The method also includes combining, by each combiner of a set of combiners, two or more of the separate signals and down-converting, by a set of mixers, the combined signals. The method further includes sampling, by at least one analog-to-digital converter (ADC), the down-converted signals and determining, by processing circuitry, data in the first, second, and third messages based on an output of the at least one ADC.

Example 2. A method is for demodulating a first message in a first frequency band, a second message in a second frequency band, and a third message in a third frequency band, wherein the first, second, and third frequency bands are non-overlapping bands. The method includes receiving, by a receiver, signals encoding the first, second, and third messages and down-converting, by a mixer, the received signals to intermediate-frequency (IF) signals based on a local oscillator signal. The method also includes sampling, by at least one analog-to-digital converter (ADC), the IF signals at a sampling rate, where a frequency band of the IF signals encoding the first message falls within a first Nyquist region, and a frequency band of the IF signals encoding the second message falls within a second Nyquist region. The first and second Nyquist regions are frequency ranges bounded by multiples of one-half of the sampling rate, and the second Nyquist region is different from the first Nyquist region. The method further includes determining, by processing circuitry, data in the first, second, and third messages based on an output of the at least one ADC.

Example 3. The method of example 1 or example 2, further including receiving, by a first switch, a first signal in the third frequency band from a first splitter of the set of splitters.

Example 4. The method of examples 1-3 or any combination thereof, further including receiving, by the first switch, a second signal in the third frequency band from a second splitter of the set of splitters.

Example 5. The method of examples 1-4 or any combination thereof, further including outputting, by the first switch, the first signal or the second signal to a first combiner of the set of combiners.

Example 6. The method of examples 1-5 or any combination thereof, further including receiving, by a second switch, a third signal in the first frequency band from the first splitter.

Example 7. The method of examples 1-6 or any combination thereof, further including receiving, by the second switch, a fourth signal in the first frequency band from the second splitter.

Example 8. The method of examples 1-7 or any combination thereof, further including outputting, by the second switch, the third signal or the fourth signal to the first combiner.

Example 9. The method of examples 1-8 or any combination thereof, further including receiving, by a third switch, a fifth signal from a port of a first antenna of the at least two antennas.

Example 10. The method of examples 1-9 or any combination thereof, further including receiving, by the third switch, a sixth signal from a port of a second antenna of the at least two antennas.

Example 11. The method of examples 1-10 or any combination thereof, further including outputting, by the third switch, the fifth signal or the sixth signal to a second combiner of the set of combiners.

Example 12. The method of examples 1-11 or any combination thereof, further including receiving, by a fourth switch, a first signal in the first frequency band from a first splitter of the set of splitters.

Example 13. The method of examples 1-12 or any combination thereof, further including receiving, by the fourth switch, a second signal in the first frequency band from a second splitter of the set of splitters.

Example 14. The method of examples 1-13 or any combination thereof, further including outputting, by the fourth switch, the first signal or the second signal to a mixer of the set of mixers.

Example 15. The method of examples 1-14 or any combination thereof, wherein a frequency band of the IF signals encoding the third message falls within a third Nyquist region based on the sampling rate.

Example 16. The method of examples 1-15 or any combination thereof, wherein the third Nyquist region is different from the first Nyquist region.

Example 17. The method of examples 1-16 or any combination thereof, wherein the third Nyquist region is different from the second Nyquist region.

Example 18. The method of examples 1-17 or any combination thereof, wherein determining the data in the first message is based on a first image of the IF signals encoding the first message.

Example 19. The method of examples 1-18 or any combination thereof, wherein the first image is located in a lowest Nyquist region.

Example 20. The method of examples 1-19 or any combination thereof, wherein determining the data in the second message is based on a second image of the IF signals encoding the second message.

Example 21. The method of examples 1-20 or any combination thereof, wherein the second image is located in the lowest Nyquist region.

Example 22. The method of examples 1-21 or any combination thereof, wherein a band of the first image spans six megahertz.

Example 23. The method of examples 1-22 or any combination thereof, wherein a band of the second image spans one megahertz.

Example 24. The method of examples 1-23 or any combination thereof, wherein the band of the first image does not overlap with the band of the second image.

Example 25. A system including circuitry configured to perform the method of examples 1-24 or any combination thereof.

Example 26. A system comprising means for performing each of the method steps of examples 1-24 or any combination thereof.

Example 27. A device includes a computer-readable medium having executable instructions stored thereon, configured to be executable by processing circuitry for causing the processing circuitry to perform the method of examples 1-24 or any combination thereof.

Example 28. A system includes at least two antennas configured to receive signals encoding first, second, and third messages in first, second, and third frequency bands. The system also includes a set of splitters configured to generate separate signals in the first, second, and third frequency bands. The system further includes a set of combiners, wherein each combiner of the set of combiners is configured to combine two or more of the separate signals. The system includes a set of mixers configured to down-convert the combined signals and at least one analog-to-digital converter configured to sample the down-converted signals. The system also includes processing circuitry configured to determine data in the first, second, and third messages based on an output of the at least one analog-to-digital converter.

Example 29. A system is for demodulating a first message in a first frequency band, a second message in a second frequency band, and a third message in a third frequency band, wherein the first, second, and third frequency bands are non-overlapping bands. The system includes a receiver configured to receive signals encoding the first, second, and third messages and a mixer configured to down-convert the received signals to intermediate-frequency (IF) signals based on a local oscillator signal. The system also includes at least one analog-to-digital converter (ADC) configured to sample the IF signals at a sampling rate, where a frequency band of the IF signals encoding the first message falls within a first Nyquist region, and a frequency band of the IF signals encoding the second message falls within a second Nyquist region. The first and second Nyquist regions are frequency ranges bounded by multiples of one-half of the sampling rate, and the second Nyquist region is different from the first Nyquist region. The system further includes processing circuitry configured to determine data in the first, second, and third messages based on an output of the at least one ADC.

Example 30. A system is for demodulating a first message in a first frequency band, a second message in a second frequency band, and a third message in a third frequency band, wherein the first, second, and third frequency bands are non-overlapping bands. The system includes a first splitter configured to generate a first signal in the first frequency band, a second signal in the second frequency band, and a third signal in the third frequency band. The system also includes a second splitter configured to generate a fourth signal in the first frequency band, a fifth signal in the second frequency band, and a sixth signal in the third frequency band. The system further includes a first switch configured to receive the third signal and the sixth signal and to output the third signal or the sixth signal. The system includes a first combiner configured to receive the fifth signal from the second splitter and to receive the third signal or the sixth signal outputted by the first switch.

Example 31. The system of examples 28-30 or any combination thereof, where the processing circuitry is configured to perform the methods of examples 1-24 or any combination thereof.

Example 32. The system of examples 28-31 or any combination thereof, further including a first switch configured to receive a first signal in the third frequency band from a first splitter of the set of splitters.

Example 33. The system of examples 28-32 or any combination thereof, wherein the first switch is configured to receive a second signal in the third frequency band from a second splitter of the set of splitters.

Example 34. The system of examples 28-33 or any combination thereof, wherein the first switch is configured to output the first signal or the second signal to a first combiner of the set of combiners.

Example 35. The system of examples 28-34 or any combination thereof, wherein the first combiner is configured to receive the first signal or the second signal.

Example 36. The system of examples 28-35 or any combination thereof, wherein the first combiner is configured to a third signal in the second frequency band outputted by the second splitter.

Example 37. The system of examples 28-36 or any combination thereof, further including a second switch configured to receive a third signal in the first frequency band from the first splitter.

Example 38. The system of examples 28-37 or any combination thereof, further including a second switch configured to receive a fourth signal in the first frequency band from the second splitter.

Example 39. The system of examples 28-38 or any combination thereof, further including a second switch configured to output the third signal or the fourth signal to the first combiner.

Example 40. The system of examples 28-39 or any combination thereof, wherein the first splitter is configured to receive signals from a first antenna of the at least two antennas.

Example 41. The system of examples 28-40 or any combination thereof, wherein the second splitter is configured to receive signals from a second antenna of the at least two antennas.

Example 42. The system of examples 28-41 or any combination thereof, further including a third switch configured to receive a fifth signal in the third frequency band.

Example 43. The system of examples 28-42 or any combination thereof, wherein the third switch is configured to receive a sixth signal in the third frequency band.

Example 44. The system of examples 28-43 or any combination thereof, wherein the third switch is configured to output the fifth signal or the sixth signal to a second combiner of the set of combiners.

Example 45. The system of examples 28-44 or any combination thereof, wherein the second combiner is configured to receive a seventh signal in the second frequency band from the first splitter.

Example 46. The system of examples 28-45 or any combination thereof, wherein the second combiner is configured to receive the fifth signal or the sixth signal from the third switch.

Example 47. The system of examples 28-46 or any combination thereof, further including a first combiner of the set of combiners configured to receive a first signal in the second frequency band from a first splitter of the set of splitters.

Example 48. The system of examples 28-47 or any combination thereof, further including a second combiner of the set of combiners configured to receive a second signal in the second frequency band from a second splitter of the set of splitters.

Example 49. The system of examples 28-48 or any combination thereof, further including a fourth switch configured to receive a first signal in the first frequency band from a first splitter of the set of splitters.

Example 50. The system of examples 28-49 or any combination thereof, wherein the fourth switch is configured to receive a second signal in the first frequency band from a second splitter of the set of splitters.

Example 51. The system of examples 28-50 or any combination thereof, wherein the fourth switch is configured to output the first signal or the second signal to a mixer of the set of mixers.

Example 52. The system of examples 28-51 or any combination thereof, wherein the first combiner is configured to receive a first signal in the first frequency band from the first splitter.

Example 53. The system of examples 28-52 or any combination thereof, wherein the second combiner is configured to receive a second signal in the first frequency band from the second splitter.

Example 54. The system of examples 28-53 or any combination thereof, wherein the set of splitters comprises a first triplexer configured to split a signal received by a first antenna of the at least two antennas.

Example 55. The system of examples 28-54 or any combination thereof, wherein the set of splitters comprises a second triplexer configured to split a signal received by a second antenna of the at least two antennas.

Example 56. The system of examples 28-55 or any combination thereof, wherein each triplexer of the first triplexer and the second triplexer is configured to output a first signal in the first frequency band, a second signal in the second frequency band, and a third signal in the third frequency band.

Example 57. The system of examples 28-56 or any combination thereof, wherein the set of combiners comprises a first reverse diplexer or a first reverse triplexer configured to receive a first signal in the second frequency band and a second signal in the third frequency band and to output a first combined signal to a first mixer of the set of mixers.

Example 58. The system of examples 28-57 or any combination thereof, wherein the set of combiners comprises a second reverse diplexer or a second reverse triplexer configured to receive a third signal in the second frequency band and a fourth signal in the third frequency band and to output a second combined signal to a second mixer of the set of mixers.

Example 59. The system of examples 28-58 or any combination thereof, wherein a frequency band of the IF signals encoding the third message falls within a third Nyquist region based on the sampling rate.

Example 60. The system of examples 28-59 or any combination thereof, wherein the third Nyquist region is different from the first Nyquist region.

Example 61. The system of examples 28-60 or any combination thereof, wherein the third Nyquist region is different from the second Nyquist region.

Example 62. The system of examples 28-61 or any combination thereof, wherein the sampling rate is less than two times a respective frequency of any of the IF signals encoding the first message.

Example 63. The system of examples 28-62 or any combination thereof, wherein the sampling rate is less than two times a respective frequency of any of the IF signals encoding the second message.

Example 64. The system of examples 28-63 or any combination thereof, wherein the sampling rate is less than two times a respective frequency of any of the IF signals encoding the third message.

Example 65. The system of examples 28-64 or any combination thereof, wherein the processing circuitry is configured to determine the data in the first message based on a first image of the IF signals encoding the first message.

Example 66. The system of examples 28-65 or any combination thereof, wherein the first image is located in a lowest Nyquist region.

Example 67. The system of examples 28-66 or any combination thereof, wherein the processing circuitry is configured to determine the data in the second message based on a second image of the IF signals encoding the second message.

Example 68. The system of examples 28-67 or any combination thereof, wherein the second image is located in the lowest Nyquist region.

Example 69. The system of examples 28-68 or any combination thereof, wherein a band of the first image spans at least three megahertz.

Example 70. The system of examples 28-69 or any combination thereof, wherein a band of the second image spans at least one megahertz.

Example 71. The system of examples 28-70 or any combination thereof, wherein the band of the first image does not overlap with the band of the second image.

Example 72. The system of examples 28-71 or any combination thereof, wherein the processing circuitry is configured to determine the data in the third message based on a third image of the IF signals encoding the third message.

Example 73. The system of examples 28-72 or any combination thereof, wherein the third image is located in the lowest Nyquist region.

Example 74. The system of examples 28-73 or any combination thereof, wherein a band of the first image spans at least three megahertz.

Example 75. The system of examples 28-74 or any combination thereof, wherein a band of the third image spans at least three megahertz.

Example 76. The system of examples 28-75 or any combination thereof, wherein the band of the first image does not overlap with the band of the third image.

Example 77. The systems, methods, or devices of the preceding examples or any combination thereof, wherein a frequency of the local oscillator signal is in a range of 810 MHz to 830 MHz.

Example 78. The systems, methods, or devices of the preceding examples or any combination thereof, wherein a frequency of the local oscillator signal is in a range of 890 MHz to 910 MHz.

Example 79. The systems, methods, or devices of the preceding examples or any combination thereof, wherein a frequency of the local oscillator signal is in a range of 840 MHz to 850 MHz.

Example 80. The systems, methods, or devices of the preceding examples or any combination thereof, wherein a frequency of the local oscillator signal is in a range of 860 MHz to 880 MHz.

This disclosure has attributed functionality to processing circuitry 170. Processing circuitry 170 may include one or more processors. Processing circuitry 170 may include any combination of integrated circuitry, discrete logic circuitry, analog circuitry. In some examples, processing circuitry 170 may include multiple components, such as any combination of one or more microprocessors, one or more DSPs, one or more ASICs, or one or more FPGAs, as well as other discrete or integrated logic circuitry, and/or analog circuitry. The techniques described in this disclosure may also be encoded in a non-transitory computer-readable storage medium, such as a memory coupled to processing circuitry 170. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system for demodulating radio-frequency (RF) signals, the system comprising:
   a receiver configured to receive the RF signals, wherein the RF signals include a first message encoded in a first frequency band and a second message encoded in a second frequency band, wherein the first frequency band and the second frequency band are non-overlapping bands;
   a mixer configured to down-convert the received signals to intermediate-frequency (IF) signals based on a local oscillator signal;
   at least one analog-to-digital converter (ADC) configured to sample the IF signals at a sampling rate, wherein a frequency band of a first IF signal encoding the first message falls within a first Nyquist region, wherein a frequency band of a second IF signal encoding the second message falls within a second Nyquist region, wherein the first and second Nyquist regions are frequency ranges bounded by multiples of one-half of the sampling rate, and wherein the second Nyquist region is different from the first Nyquist region; and processing circuitry configured to determine data in the first and second messages based on an output of the at least one ADC.

2. The system of claim 1,
wherein the sampling rate is less than two times a respective frequency of any portion of the first IF signal encoding the first message, and
wherein the sampling rate is less than two times a respective frequency of any portion of the second IF signal encoding the second message.

3. The system of claim 1,
wherein the processing circuitry is configured to determine the data in the first message based on a first image of the first IF signal encoding the first message, and
wherein the first image is located in a lowest Nyquist region.

4. The system of claim 3,
wherein the processing circuitry is configured to determine the data in the second message based on a second image of the second IF signal encoding the second message, and
wherein the second image is located in the lowest Nyquist region.

5. The system of claim 3,
wherein a band of the first image spans at least three megahertz,
wherein a band of the second image spans at least one megahertz, and
wherein the band of the first image does not overlap with the band of the second image.

6. The system of claim 1, wherein the at least one ADC has a maximum sampling rate of less than 220 MHz.

7. The system of claim 1, wherein the at least one ADC has a maximum sampling rate of less than 110 MHz.

8. The system of claim 1, wherein a frequency of the local oscillator signal is in a range of 810 MHz to 830 MHz.

9. The system of claim 1, wherein a frequency of the local oscillator signal is in a range of 890 MHz to 910 MHz.

10. The system of claim 1, wherein a frequency of the local oscillator signal is in a range of 840 MHz to 850 MHz.

11. The system of claim 1, wherein a frequency of the local oscillator signal is in a range of 860 MHz to 880 MHz.

12. A method for demodulating radio-frequency (RF) signals, the method comprising:
receiving, by a receiver, the RF signals, wherein the RF signals include a first message encoded in a first frequency band and a second message encoded in a second frequency band, wherein the first frequency band and the second frequency band are non-overlapping bands;
down-converting, by a mixer, the received signals to intermediate-frequency (IF) signals based on a local oscillator signal;
sampling, by at least one analog-to-digital converter (ADC), the IF signals at a sampling rate, wherein a frequency band of a first IF signal encoding the first message falls within a first Nyquist region, wherein a frequency band of a second IF signal encoding the second message falls within a second Nyquist region, wherein the first and second Nyquist regions are frequency ranges bounded by multiples of one-half of the sampling rate, and wherein the second Nyquist region is different from the first Nyquist region; and determining, by processing circuitry, data in the first and second messages based on an output of the at least one ADC.

13. The method of claim 12,
wherein determining the data in the first message is based on a first image of the first IF signal encoding the first message, and
wherein the first image is located in a lowest Nyquist region.

14. The method of claim 13,
wherein determining the data in the second message is based on a second image of the second IF signal encoding the second message, and
wherein the second image is located in the lowest Nyquist region.

15. The method of claim 14,
wherein a band of the first image spans at least three megahertz,
wherein a band of the second image spans at least five hundred kilohertz, and
wherein the band of the first image does not overlap with the band of the second image.

16. The method of claim 12,
wherein the sampling rate is less than two times a respective frequency of any portion of the first IF signal encoding the first message, and
wherein the sampling rate is less than two times a respective frequency of any portion of the second IF signal encoding the second message.

17. The method of claim 12, wherein a frequency of the local oscillator signal is in a range of 810 MHz to 830 MHz, in a range of 840 MHz to 850 MHz, in a range of 860 MHz to 880 MHz, or in a range of 890 MHz to 910 MHz.

18. A system for demodulating radio-frequency (RF) signals, the system comprising:
a receiver configured to receive the RF signals, wherein the RF signals include a first message encoded in a first frequency band and a second message encoded in a second frequency band, wherein the first frequency band and the second frequency band are non-overlapping bands;
a mixer configured to down-convert the received signals to intermediate-frequency (IF) signals based on a local oscillator signal;
at least one analog-to-digital converter configured to sample the IF signals at a sampling rate; and
processing circuitry configured to:
determine data in the first message based on a first image of a first IF signal encoding the first message; and
determine data in the second message based on a second image of a second IF signal encoding the second message,
wherein the first and second images are located in a lowest Nyquist region,
wherein a frequency band of the first IF signal encoding the first messages falls within a first Nyquist region,
wherein a frequency band of the second IF signal encoding the second messages falls within a second Nyquist region,
wherein the first and second Nyquist regions are frequency ranges bounded by multiples of one-half of the sampling rate,
wherein the second Nyquist region is different from the first Nyquist region, and
wherein the second Nyquist region is different from the lowest Nyquist region.

19. The system of claim 18, wherein the at least one analog-to-digital converter has a maximum sampling rate of less than 220 MHz.

20. The system of claim 18, wherein a frequency of the local oscillator signal is in a range of 810 MHz to 830 MHz, in a range of 840 MHz to 850 MHz, in a range of 860 MHz to 880 MHz, or in a range of 890 MHz to 900 MHz.

\* \* \* \* \*